United States Patent Office 2,859,395
Patented Nov. 4, 1958

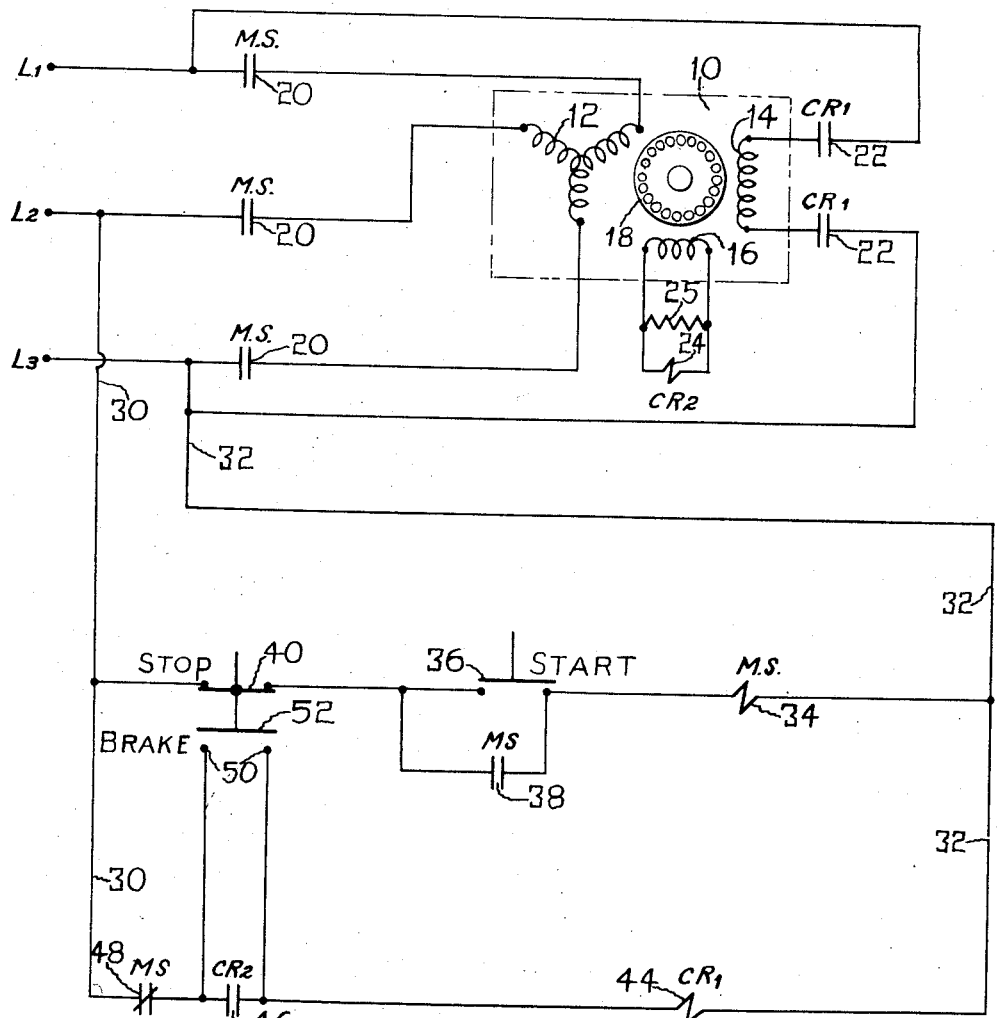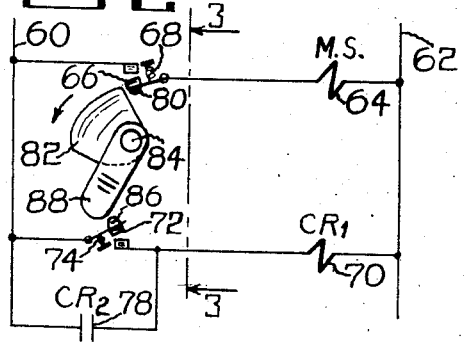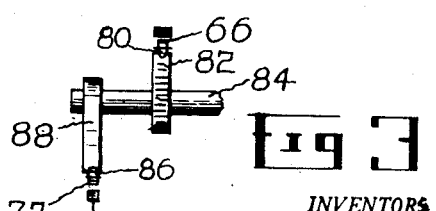

2,859,395

MOTOR CONTROL ASSEMBLY

Edwin R. Martin and Arthur G. Wise, Dayton, Ohio, assignors to Louis R. Mahrt and D. Robert Laughter, as trustees for Standard Dayton Corporation, Dayton, Ohio, a corporation of Ohio Application February 27, 1956, Serial No. 567,815

12 Claims. (Cl. 318—211)

This invention relates to a motor control assembly. The invention relates more particularly to a motor control assembly for use with a motor which has internal electrical braking components. The invention relates more particularly to a motor control assembly for use in connection with a motor built according to the invention disclosed in a Noodleman Patent No. 2,637,059. However, the invention is not so limited due to the fact that the motor control assembly of this invention may be used with other types of motors and electrical apparatus.

In a motor, such as a motor built according to the invention disclosed in Noodleman Patent No. 2,637,059, it is desirable in the operation thereof to control the energization of the braking winding so that the braking winding is deenergized when the rotor of the motor reaches zero speed. If the braking winding is deenergized when rotation of the motor ceases, the braking winding will not be subject to excessive heat.

An object of this invention is to provide a motor control assembly which may be used to cause rapid deceleration of a motor.

Another object of this invention is to provide a motor control assembly having means for stopping of a motor, which means are automatically deenergized when the motor reaches zero speed.

Another object of this invention is to provide a motor control assembly which includes an automatic timing device for starting, operating and stopping of a motor.

Other objects and advantages reside in the construction of parts, the combination thereof and the mode of operation, as will become more apparent from the following description.

Figure 1 is a schematic circuit diagram showing a motor control assembly of this invention.

Figure 2 is a schematic circuit diagram showing a modification of a portion of a motor control assembly of this invention.

Figure 3 is a section view taken substantially on line 3—3 of Figure 2.

Referring to the drawing in detail, for purposes of illustration, a motor control assembly of this invention is shown in connection with a three-phase Y connected motor. It is to be understood, however, that the invention is equally applicable to other types of electric machines, such as single phase motors, three-phase delta connected motors and other types of electric motors.

A motor control assembly of this invention is shown in connection with a motor 10 which is provided with a main stator winding or running winding 12 and an auxiliary stator winding 14. The motor 10 is also provided with a third winding or complementary winding 16. The winding 16, in combination with the winding 14, forms a two-phase winding which is disposed in the same stator slots provided for the main stator winding 12. The winding 16 is non-inductively wound with respect to the main winding 12.

The motor 10 is also provided with a rotor 18 which is herein shown as being a squirrel cage rotor. However, it is to be understood that a wound rotor or other type of rotor may also be used in such a motor.

Thus, the motor 10 may be similar to a motor built according to the Noodleman Patent No. 2,627,059. As discussed in the Noodleman Patent No. 2,627,059, the arrangement of the windings 14 and 16 are such that they establish a field having a larger number of poles than the number of poles produced by the main stator winding 12.

By virtue of the arrangement of the stator windings, it is obvious that the synchronous speed of the motor 10 energized by the running winding or main stator winding 12 may be several times as great as the synchronous speed of the motor 10 when energized solely through the auxiliary winding 14.

When the auxiliary winding 14 is energized, the current flow within the winding 16, induced through rotation of the rotor 18, becomes of sufficient value to cause rapid deceleration of the rotor 18, and causes the rotor 18 to stop.

As illustrated herein, electrical energy is supplied to the motor 10 through power supply lines L1, L2 and L3. The lines L1, L2 and L3 are connected to the main stator winding 12 by means of normally-open switch members 20 of a main switch or master switch or main contactor. Elements of the main switch or master switch are referred to in the drawing by "M. S."

The auxiliary winding 14 is connected to any two of the power supply lines. Herein, the auxiliary winding 14 is shown as being connected to power supply lines L1 and L3 by means of normally-open relay contacts 22 of a control relay, herein referred to as control relay CR1.

Connected across the third stator winding 16 is an operating coil 24 of a control relay, herein referred to as control relay CR2. If desired, a resistor 25 may also be connected across the winding 16.

Control lines 30 and 32 are shown as being connected to power supply lines L2 and L3. However, the control lines 30 and 32 may be connected to any other suitable source of electrical energy.

Connected to the control line 32 is an operating coil 34 of the master switch or main contactor mentioned above. Energization of the operating coil 34 causes closing of the switches or contacts 20 for energization of the main running winding 12. Connected to the operating coil 34, in series therewith, is a start switch 36. Connected across the stationary contacts of the start switch 36 is a normally-open switch or contact 38 of the master switch or master contactor. The contact 38 also operates by means of the operating coil 34. Connected in series with the start switch 36 is a normally-closed stop switch 40, which is also connected to the control line 30.

Connected to the control line 32 is an operating coil 44 of the control relay CR1 mentioned above. Energization of the operating coil 44 of the control relay CR1 causes closing of the switches or contacts 22 for energization of the auxiliary winding 14. Connected in series with the operating coil 44 of the control relay CR1 is a normally-open contact or switch 46 of the control relay CR2. The switch 46 is actuated upon energization of the operating coil 24 mentioned above. Connected in series with the normally-open contact or switch 46 of the control relay CR2 is a normally-closed switch or contact 48 of the master switch mentioned above. The contact 48 is also actuated by means of the operating coil 34. Connected across the normally-open contact or switch 46 of the control relay CR2 are a pair of stationary contacts 50. Engageable with the stationary contacts 50 is a brake switch 52 which is physically connected to the stop switch 40. Upon slight depression of the stop switch 40, the stop switch 40 is opened. Slight opening of the stop switch 40 does not cause engagement of the brake switch 52 with the stationary contacts 50. However, greater opening of the stop switch 40 also causes engagement of the brake switch 52 with the stationary contacts 50.

OPERATION

When it is desired to start the motor 10, the start switch 36 is momentarily closed. Thus, the operating coil 34 of the master switch is energized through the control leads 30 and 32. Thus, the switches or contacts 20 are closed, energizing the main stator winding 12. Also, upon energization of the operating coil 34, the normally-open contact 38 is closed, and the normally-closed contact 48 is opened. Closing of the contact 38 "seals-in" the circuit across the start switch 36 so that the start switch 36 may be permitted to open and the operating coil 34 remains energized. Opening of the normally-closed contact 48, with energization of the coil 34 prevents energization of the operating coil 44 which might otherwise occur through the contact 46 as a result of voltage surges during the starting of the motor 10. Thus, the motor 10 is started by momentary closing of the start switch 36.

When it is desired to stop the motor 10, the stop switch 40 may be opened slightly for interrupting the circuit to the operating coil 34 of the master switch. Deenergization of the operating coil 34 results in opening of the switches 20 and results in opening of the switch 38. Also deenergization of the operating coil 34 results in closing of the contact 48. Due to the fact that upon slight opening of the stop switch 40, the auxiliary winding 14 is not energized, the winding 16 also remains deenergized. Thus, upon slight opening of the stop switch 40, the rotor 18 of the motor 10 is permitted to coast and to decelerate slowly.

If it is desired to rapidly stop rotation of the rotor 18 of the motor 10, the stop switch 40 is depressed or opened further so that the brake switch 52, which moves with the stop switch 40, engages the contacts 50. Thus, due to the fact that the contact 48 is closed with deenergization of the operating coil 34, closing of the brake switch 52 completes a circuit to the operating coil 44 for energization thereof. Energization of the coil 44 causes closing of the contacts 22 of the control relay CR1. Closing of the contacts 22 causes energization of the auxiliary winding.

Energization of the auxiliary winding 14 causes a flux to be established in the rotor 18. The rotating rotor thus induces a voltage in the winding 16. Therefore, the operating coil 24 of the control relay CR2 is energized. Energization of the operating coil 24 causes closing of the normally-open contact 46 which is in series with the operating coil 44 of the control relay CR1. Closing of the switch 46 "seals-in" across the brake switch 52 so that the brake switch 52 may be opened while the operating coil 44 remains energized through the contacts 46 and 48.

Therefore, while the rotor 18 is rotating during energization of the auxiliary winding 14 the winding 16 is energized, causing energization of the operating coil 24 of the control relay CR2. The control relay CR2, while energized, maintains the contact 46 in a closed position so that the operating coil 44 of the control relay CR1 remains energized.

When the rotor 18 reaches zero speed, the winding 16 becomes deenergized even though the auxiliary winding 14 is energized. When the voltage in the winding 16 is reduced below the holding point of the operating coil 24, the contact 46 of the control relay CR2 opens, interrupting the circuit to the operating coil 44, causing deenergization thereof. Thus, with deenergization of the operating coil 44 of the control relay CR1, the switches or contacts 22 are permitted to open, resulting in deenergization of the auxiliary winding 14. Thus, all of the windings of the motor 10 are deenergized.

Therefore, it is understood that when the motor 10 is operating and it is desired to bring the rotor 18 to a quick stop, closing of the brake switch 52, by means of the stop switch 40, results in rapid deceleration of the rotor 18.

Modification shown in Figures 2 and 3

In Figure 2 a modification of a portion of a motor control assembly of this invention is shown. The modification shown in Figures 2 and 3 is adapted for use in an operation sequence in which a motor such as the motor 10 starts and operates for a given length of time, then comes to a stop quickly, remains at zero speed for a given length of time, followed by starting and operating through the same sequence, and continues to repeat the cycle.

In Figure 2, as shown, control leads 60 and 62, which are similar to control leads 30 and 32, may be connected to any suitable source of electrical energy. The circuit shown in Figure 2 may be used to replace the start, stop, and brake circuits connected to control leads 30 and 32 shown in Figure 1. Thus, it is understood that the control circuit shown in Figure 2 is operable with the main switches 20, with the control switches 22, and with the operating coil 24 shown in Figure 1.

An operating coil 64 which is similar to the operating coil 34, shown in Figure 1, is used to operate the main switches 20, shown in Figure 1. Connected in series with the operating coil 64 is a normally-open switch 66 which is also connected to the control lead 60. The switch 66 is urged toward open position by means of a spring member 68.

Connected to the control lead 62 is an operating coil 70 of the control relay CR1. Connected in series with the operating coil 70 is a normally-open switch 72 which is also connected to the control lead 60. The switch 72 is urged toward open position by a spring member 74. Connected across the switch member 72 is a normally-open switch or contact 78 of the control relay CR2 which is adapted to be operated by the operating coil 24 shown in Figure 1. The switches 66 and 72 are adapted to be cam operated. The switch 66 has an arcuate engagement portion 80 for engagement by a cam member 82 for closing thereof. The cam member 82 is attached to a rotatable drive shaft 84 disposed intermediate the switches 66 and 72. The switch 72 has an engagement portion 86 for engagement by a cam 88, which is also attached to the shaft 84.

The shaft 84 may be rotated by any suitable means; for example, the shaft 84 may be rotated by means of a motor for rotation at a desired rate of speed. The cams 82 and 88 are adapted to be rotated in a counter-clockwise direction as shown in Figure 2. Thus, as the shaft 84 is rotated, the cam 82 engages the engagement portion 80 of the switch 66 causing closing thereof. Thus, the operating coil 64 is energized. When the operating coil 64 is energized, the main switch members 20 are closed, energizing the stator winding 12 of the motor 10.

The switch 66 is held closed by the cam 82 as the shaft 84 rotates until the cam 82 is rotated to such an extent that the cam member 82 leaves engagement with the engagement surface 80 of the switch member 66. In Figure 2 the cam member 82 is shown in rotation immediately following disengagement thereof with the engagement member 80 of the switch 66. Therefore, the switch member 80 opens, deenergizing the operating coil 64 of the master switch thus permitting the switch members 20 to open so that the main winding 12 is deenergized.

The shaft 84 in its rotation carries the cam member 88 into engagement with the engagement portion 86 of the switch 72. Thus, the switch 72 is closed causing energization of the coil 70. When the operating coil 70 is energized, the switches or contacts 22 are closed, thus energizing the auxiliary winding 14.

As discussed above, energization of the auxiliary winding 14 causes a flux to be induced within the rotor 18, resulting in an induced voltage in the winding 16, thus energizing the operating coil 24. Energization of the operating coil 24 results in closing of the normally-open contact 78 of the control relay CR2. Thus, the circuit to the operating coil 70 of the control relay CR1 is "sealed-in." Therefore, even though the cam member 88 is rotated to such an extent that there is disengagement thereof from the engagement member 86 of the switch member 72, the operating coil 70 of the control relay CR1 remains energized until the rotor member 18 reaches zero speed. Thus, the stator winding 16 is deenergized which causes deenergization of the operating coil 24 of the control relay CR2. When the control relay CR2 is deenergized, the contact 78 of the control relay CR2 is permitted to open, deenergizing the operating coil 70 of the control relay CR1. When the control relay CR1 is deenergized, the contacts or switches 22 are opened so that the auxiliary winding 14 is deenergized.

As shown in Figure 3, the cam members 88 are attached to the shaft member 84 in spaced apart relation. The cam members 82 and 88 may be rotatably adjusted, one with respect to the other, upon the shaft member 84 so that any suitable timing operation may be obtained. Thus, it is understood that the modification of this invention as shown in Figures 2 and 3 provides means by which a motor such as the motor 10 may be started, operated, and stopped according to any desired time schedule.

It is also to be understood that the motor control assembly of this invention provides means by which a braking type of motor may be operated as desired and may be either slowly or quickly decelerated, as desired. It is also to be understood that the motor control assembly of this invention includes means for automatically deenergizing the braking circuits of the motor under operation when the motor has reached zero speed.

Although the preferred embodiment of the device has been described, it will be understood that within the purview of this invention various changes may be made in the form, details, proportions and arrangement of parts, the combination thereof and mode of operation, which generally stated consist in a device capable of carrying out the objects set forth, as disclosed and defined in the appended claims.

Having thus described our invention, we claim:

1. In a control assembly for an induction motor of the type having a stator, a rotor, the stator being provided with a main winding arranged to establish a given number of poles, the stator also having a two-phase brake winding arranged to establish a greater number of poles, a source of electrical energy, the combination comprising a main contactor connecting the main winding to the source of electrical energy, an auxiliary contactor connecting one phase of the two-phase brake winding to the source of electrical energy, a first relay, the first relay having an operating coil connected across the other phase of the two-phase brake winding, the first relay thus being responsive to voltage induced in the said other phase of the brake winding, a control circuit, the control circuit including a series circuit comprising a start switch, a normally-closed stop switch and an operating coil for the main contactor, the control circuit also including a series circuit comprising a normally-closed switch operable with the main contactor, a normally-open switch of the first relay, an operating coil of the auxiliary contactor, and a normally-open brake switch connected across the normally-open switch of the first relay and operable with the stop switch, closing of the brake switch with opening of the stop switch causing energization of the operating coil of the auxiliary contactor thus energizing said one phase of the two-phase brake winding, thus energizing the other phase of the two-phase brake winding during rotation of the rotor, energization of said other phase causing energization of the operating coil of the first relay connected thereacross, thus causing closing of the normally-open switch of the first relay, thus maintaining a closed circuit to the operating coil of the auxiliary contactor and causing braking action to the rotor until the rotor is substantially at zero speed.

2. In a control assembly for a motor of the type provided with a stator, a rotor, a main stator winding arranged to establish a given number of poles, an auxiliary stator winding arranged to establish a greater number of poles for braking operation, a third stator winding displaced 90 degrees electrically with respect to the auxiliary stator winding, the third stator winding being non-inductively wound with respect to the main stator winding, a source of electrical energy, the combination comprising a magnetic contactor having normally-open switch members connecting the main stator winding to the source of electrical energy, a first relay, a second relay, the first relay including a voltage sensitive operating coil for operation thereof connected across the third stator winding, the second relay including a normally-open switch connecting the auxiliary winding to the source of electrical energy, a pair of control conductors connected to the source of electrical energy, the magnetic contactor including an operating coil for operation of the switch members thereof, the operating coil being connected to one of the control conductors, a normally-open start switch connected to the contactor coil in series therewith, a normally-closed stop switch connected to the other control conductor and connected to the start switch in series therewith, a normally-open switch operable by the contactor coil and connected across the start switch, a normally-closed switch operable by the contactor coil and connected to one of the control conductors, a normally-open switch of the first relay connected to the last said normally-closed switch, an operating coil of the second relay connected to the other control conductor and connected in series relation to the normally-open switch of the first relay, and a brake switch connected across the normally-open switch of the first relay, the brake switch being physically attached to the stop switch.

3. In combination with an induction motor provided with a stator having a main winding arranged to establish a given number of poles and a two-phase brake winding arranged to establish a greater number of poles, a control assembly comprising means for energization of the main winding, means for energization of the brake winding, a control relay, the control relay having an operating coil connected across a portion of the brake winding, control means for operation of the means for energization of the main winding, actuator means for operation of the means for energization of the brake winding, the control relay including means for deenergizing said actuator means.

4. A control assembly for operation of a motor provided with a running winding arranged to establish a given number of poles, and a braking winding arranged to establish a greater number of poles, a source of electrical energy, a portion of the braking winding being non-inductively wound with respect to the running winding, the other portion of the braking winding being angularly disposed with respect to the first said portion thereof, the combination comprising first switch means, the first switch means connecting the running winding to the source of electrical energy, second switch means, the second switch means connecting said other portion of the braking winding to the source of electrical energy, control means for operation of the first switch means, actuator means for operation of the second switch means, the actuator means including voltage operable means electrically connected to the first said portion of the braking winding for operation thereby.

5. In a control assembly for operation of an electric motor provided with a running winding arranged to establish a given number of poles and a two-phase braking winding arranged to establish a greater number of poles, first switch means, the first switch means being connected to the running winding, second switch means, the second switch means being connected to one phase of the two-phase braking winding, a voltage sensitive relay coil electrically connected across the other phase of the two-phase winding, a magnetic coil for operation of the first switch means, a magnetic coil for operation of the second switch means, a pair of normally-open switch members, there being one of the switch members electrically connected in series relation with each of said magnetic coils for joining the coil to a source of electrical energy, a rotatable shaft disposed intermediate said switch members, a pair of cam members attached to the shaft and rotatable therewith, each of the cam members being engageable with one of the switch members for operation thereof, and a normally-open contact member electrically connected in parallel relation with said switch member in series with the magnetic coil for operation of the second switch means, said normally-open contact member being operable by said relay coil.

6. In a motor and control assembly, an induction motor provided with a squirrel cage rotor, a stator having a main winding arranged to establish a given number of poles, a first brake winding and a second brake winding, the brake windings being arranged to establish a greater number of poles than the given number, first switch means, the first switch means being connected to the main winding, second switch means, the second switch means being connected to the first brake winding, first actuator means, the first actuator means being operably attached to the first switch means for operation thereof, second actuator means, the second actuator means being operably attached to the second switch means for operation thereof, third actuator means, the third actuator means being voltage responsive and electrically connected to the second auxiliary winding and operable thereby, the second brake winding being energized by voltages induced therein by the rotor during rotation thereof with energization of the first brake winding, the third actuator means being electrically connected to the second actuator means and operable to deactuate the second actuator means after the motor speed has dropped below a predetermined value.

7. A control assembly for operation of an induction motor having a stator provided with a main winding arranged to establish a given number of magnetic poles, a second winding arranged to establish a greater number of magnetic poles, a third winding, the third winding being non-inductively wound with respect to the main winding, the third winding being energized during rotation of the rotor with energization of the second winding, the combination including a main switch connected to the main winding for energization thereof, a normally-open auxiliary switch connected to the second winding for energization thereof, a relay, the relay including a voltage coil connected across the third winding, a first control means, the first control means being electrically connected to the main switch for operation thereof, a second control means, the second control means being electrically connected to the auxiliary switch for operation thereof, the relay including switch means connected to said second control means, the coil of the relay causing the second control means to open the auxiliary switch when the voltage across the third winding is below a predetermined value.

8. In a control assembly for an electric motor having a rotor, a first stator winding arranged to establish a given number of poles, a second stator winding arranged to establish a greater number of poles, and a third stator winding, the first stator winding being a running winding, the second stator winding and the third stator winding being braking windings and electrically angularly displaced one with respect to the other, the third stator winding being non-inductively wound with respect to the first stator winding, the third stator winding being energized during energization of the second stator winding with rotation of the rotor, the combination including means for energization of the second stator winding, and means electrically connected to the third stator winding and to the means for energization of the second stator winding operable by change in voltage across the third stator winding for deenergization of the second stator winding.

9. In a motor, a rotor, a stator having a main winding arranged to establish a given number of magnetic poles, an auxiliary two-phase winding arranged on said stator so as to establish a number of magnetic poles in excess of said given number, first switch means for controlling the energization of said main winding, second switch means for controlling the energization of one phase only of said auxiliary winding, means for substantially simultaneously opening said first switch means and for closing said second switch means, and means responsive to the voltage across the other phase of said auxiliary winding for opening the circuit to the auxiliary winding after the motor speed has dropped below a predetermined value.

10. In a motor, a rotor, a stator having a main winding arranged to establish a given number of magnetic poles, an auxiliary two-phase winding arranged on said stator so as to establish a number of magnetic poles in excess of said given number, first switch means, the first switch means being connected to the main winding for controlling energization thereof, second switch means, the second switch means being connected to one phase only of said auxiliary winding for controlling energization thereof, the last said means including voltage sensitive means, a first electro-magnetic actuator for operation of the first switch means, a second electro-magnetic actuator for operation of the second switch means, means for substantially simultaneously operating the first and second electro-magnetic actuators for opening said first switch means and for closing said second switch means for braking the rotor, and voltage sensitive means connected across the other phase of the auxiliary winding for operation of the second electro-magnetic actuator for opening the second switch means when the rotor speed has been reduced below a predetermined value.

11. In a motor, a rotor, a stator having a main winding arranged to establish a given number of magnetic poles, an auxiliary two-phase winding arranged on said stator so as to establish a number of magnetic poles in excess of said given number, first switch means, the first switch means being connected to the main winding for controlling energization thereof, second switch means, the second switch means being connected to one phase only of said auxiliary winding for controlling energization thereof, means for shorting the other phase of the auxiliary winding, the last said means including voltage sensitive means, means for substantially simultaneously opening said first switch means and for closing said second switch means for braking the rotor, and means operable by said voltage sensitive means for opening the second switch means after the rotor speed has been reduced below a predetermined value.

12. In a motor, a rotor, a stator having a main winding arranged to establish a given number of magnetic poles, a brake winding arranged to establish a number of magnetic poles in excess of the given number, the brake winding including a first winding and a second winding, the first and second windings being arranged so as to establish magnetic poles which are in electrical angular relationship, the second winding being energized during energization of the first winding with rotation of the rotor, first switch means for controlling energization of the main winding, second switch means for controlling energization of the first winding of the brake winding, means for substantially simultaneously opening said first switch means and for closing said second switch means for stopping rotation of the rotor, and voltage responsive means electrically connected across the second winding of the brake winding for opening the second switch means after the speed of the rotor has dropped below a predetermined value.

References Cited in the file of this patent

UNITED STATES PATENTS

| | | |
|---|---|---|
| 1,315,965 | Jennings | Sept. 16, 1919 |
| 1,991,035 | Werner | Feb. 12, 1935 |
| 2,510,468 | Fuge | June 6, 1950 |
| 2,514,896 | Noodleman | July 11, 1950 |
| 2,539,857 | Noodleman | Jan. 30, 1951 |
| 2,589,278 | Noodleman | Mar. 18, 1952 |
| 2,627,059 | Noodleman | Jan. 27, 1953 |